United States Patent Office 2,864,488
Patented Dec. 16, 1958

2,864,488

FLANGED CONVEYOR BELT

Victor K. Taipale, Akron, Ohio, assignor to The B. F. Goodrich Company, New York, N. Y., a corporation of New York Application February 23, 1955, Serial No. 489,837

3 Claims. (Cl. 198—201)

This invention relates to conveyor belts having upstanding flanges along the marginal edges of the load-carrying surface. Such belts are commonly used for transporting materials immersed in liquid, the flanges serving to prevent the liquid from spilling from the sides of the belt. An example of such use is in the canning and food processing industry where fruit or other food is frequently moved by such belts along with juice or water or the like through the processing stations.

It has been widely recognized that when a flanged conveyor belt moves around a pulley about which it is trained the flanged portions are stretched appreciably more than the carcass portion and eventually the flanges tend to crack and tear apart in a direction normal to the carcass. To avoid destroying the flanges it has been proposed to design the flanges so that they fold inwardly against the belt when the belt is flexed, or to cut the flanges perpendicularly to the carcass so that the flanges tend to fan apart when the belt moves around the pulley. The former is objectionably expensive and the latter is unsatisfactory in that it permits leakage of the liquid through the flanges.

In accordance with this invention a flanged conveyor belt is provided in which the flanges are separated transversely at comparatively closely-spaced intervals into a series of coaxial endwise-abutting flange sections, the end faces of which abut in a plane which is oriented obliquely to the centerline of the belt and which is also oblique to the surface of the belt. The orientation of this plane is such that in the load-carrying reach of a belt, the lateral pressure of the load against the side flanges presses the mating end faces together. The belts of this invention are preferably formed of rubber and fabric materials with the flanges of rubber and integral with the carcass and continuous along the belt margins, and after vulcanization these flanges are cut transversely at the desired plane without removing a substantial amount of rubber from the flanges thereby dividing the flanges into a series of endwise abutting flange sections, each integral with the carcass portion of the belt.

The invention will be further described with reference to the accompanying drawing in which.

Figures 1, 2:
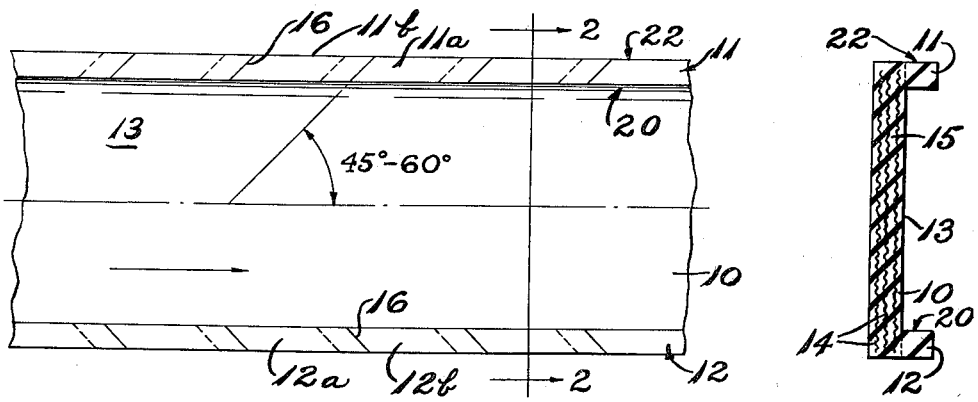
Fig. 1 is a plan view of a flanged conveyor belt constructed in accordance with and embodying this invention.
Fig. 2 is a cross-sectional end view of the conveyor belt taken on line 2—2 of Fig. 1.

In the preferred form of the invention a belt is formed of a carcass portion 10 having upstanding flanges 11 and 12, respectively, along each margin of the load-carrying surface 13. The carcass portion in this embodiment is a lamination of several plies 14 of rubber-impregnated belt duck fabric with a surrounding rubber cover 15. The flanges 11 and 12 are preferably unreinforced rubber but they may be reinforced if desired and the carcass may be made in a variety of different ways in accordance with conventional belt construction. The belt and carcass may be formed of either natural rubber or man-made rubber-like materials including vinyl compositions and the like. While the flanges 11 and 12 in the drawing are shown to have a rectangular cross-sectional shape for simplicity, obviously they may have other contours.

Preferably the belt is vulcanized with the flanges extending continuously along each edge and then after vulcanization the flanges are sliced or severed transversely at periodic intervals as at 16 to divide each flange into a series of endwise abutting flange sections such as the sections 11a, 11b, etc., and the sections 12a, 12b, etc. The dividing cuts are preferably made with a thin heated knife so that very little of the material of the flanges is removed and as a result the opposing cut surfaces forming the end faces of their respective flange sections abut each other. Each cut extends from the upper surface of the flange, downwardly through the flange from one side through the opposite side and terminates close to the carcass of the belt.

Figure 3:
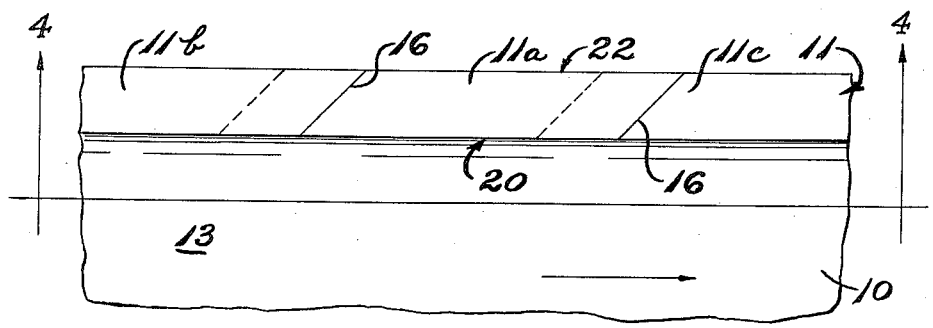
Fig. 3 is a fragmentary plan view drawn on an enlarged scale of the upper flange of the belt as shown in Fig. 1.
Figure 4:
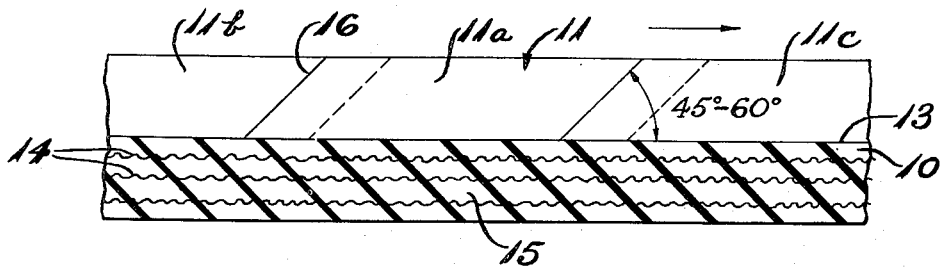
Fig. 4 is a sectional view showing the load-side of the flange of Fig. 3, the view being taken on line 4—4 of Fig. 3.

Figs. 3 and 4 illustrate the orientation of the plane along which the transverse cuts are made. As shown, the end faces of the flange sections formed by the cuts extend upwardly and forwardly in the direction of travel of the belt (see arrows of Figs. 1, 3 and 4) from a position adjacent the carcass to the top surface of the flanges at an angle between about 45° and about 60° to the load-carrying surface of the belt. Also, the end faces of each section extend from the inside surface 20 of each flange forwardly in the direction of travel of the belt to the outside surface 22 of each flange, at an angle to the centerline of the belt of between about 45° and about 60°.

The cuts may be spaced along the flange at various distances apart depending on the curvature of the pulleys about which the belt is trained. Cuts spaced about six inches apart in each flange have been found suitable where the belt is trained around pulleys of about eight inches in diameter. Generally the spacing between adjacent cuts should be not more than the diameter of the smallest pulley about which the belt is trained.

It may be seen in Figs. 3 and 4 that the weight of a liquid or other load in the trough formed by the flanges acts against the inside surface of the flange sections to bend the flange sections outwardly thus pressing the end faces of the flange sections into close abutting contact to prevent leakage of the load between the flange sections.

The preferred angle of the plane of the cuts relative to the center line of the belt and the surface of the belt, are suitable for the majority of installations of this type found in the canning and food processing industry.

Variations in the structure disclosed may be made within the scope of the appended claims.

I claim:

1. A conveyor belt comprising a generally flat flexible carcass portion having an upstanding flange of rubber-like material along the marginal edges of one side of the carcass portion, each flange being severed transversely at periodic intervals without the removal of any substantial material of the flanges to provide opposing abutting surfaces at each point of severance, said opposing surfaces at each point of severance being in a plane oriented at an acute angle to the centerline of the belt and oriented also at an acute angle to the load-carrying surface of the belt.

2. A conveyor belt comprising a generally flat flexible carcass portion having an upstanding flange of rubber-like material along the marginal edges of one side of the carcass portion, each flange comprising a series of axialaligned flange sections having end faces at opposite ends thereof abutting corresponding end faces of adjacent flange sections, each pair of opposing end faces mating in a plane which extends from the inside surface forwardly in the direction of travel of the belt to the outside surface of the flange and which also extends upwardly and forwardly in the direction of travel of the belt from a position adjacent the carcass portion to the upper side of said flange.

3. A conveyor belt in accordance with claim 1 in which said plane of said end faces is oriented at an angle from about 45° to about 60° with the direction of travel of the belt and is also oriented at an angle from about 45° to about 60° with the load-carrying surface of said carcass portions.

References Cited in the file of this patent
UNITED STATES PATENTS 2,711,816     Reno ------------------ June 28, 1955